United States Patent
Langeland

(10) Patent No.: US 8,269,669 B2
(45) Date of Patent: Sep. 18, 2012

(54) METHOD FOR RETRIEVING A GEOGRAPHICAL POINT ON THE SEABED

(76) Inventor: Bjarte Langeland, Stavanger (NO)

( * ) Notice: Subject to any disclaimer, the term of this patent is extended or adjusted under 35 U.S.C. 154(b) by 281 days.

(21) Appl. No.: 12/811,830

(22) PCT Filed: Jan. 13, 2009

(86) PCT No.: PCT/NO2009/000016
§ 371 (c)(1),
(2), (4) Date: Aug. 17, 2010

(87) PCT Pub. No.: WO2009/091262
PCT Pub. Date: Jul. 23, 2009

(65) Prior Publication Data
US 2010/0302103 A1   Dec. 2, 2010

(30) Foreign Application Priority Data
Jan. 16, 2008   (NO) .................................. 20080270

(51) Int. Cl.
*G01S 5/04* (2006.01)
(52) U.S. Cl. ........................... 342/459; 367/128
(58) Field of Classification Search .................. 342/459; 367/128
See application file for complete search history.

(56) References Cited

U.S. PATENT DOCUMENTS

| | | | | |
|---|---|---|---|---|
| 5,357,437 A | * | 10/1994 | Polvani | 701/518 |
| 6,058,071 A | * | 5/2000 | Woodall et al. | 367/3 |
| 7,365,650 B1 | * | 4/2008 | Ruffa | 340/850 |
| 7,796,466 B2 | * | 9/2010 | Combee et al. | 367/15 |
| 2006/0256652 A1 | | 11/2006 | Thomas | |

FOREIGN PATENT DOCUMENTS

| | | |
|---|---|---|
| GB | 2125965 | 3/1984 |
| GB | 2206762 | 1/1989 |

OTHER PUBLICATIONS

Brignone et al, "A fully autonomous docking strategy for intervention AUV's", Oceans 200, Jun. 1, 2007 pp. 1-6.
Sonardyn Ltd Marine Seismic Products Guide Acoustic Positioning, NAvigation and asset tracking System, Oct. 2005.

* cited by examiner

*Primary Examiner* — Gregory C Issing
(74) *Attorney, Agent, or Firm* — Christian D. Abel

(57) ABSTRACT

The invention involves one or more radio markers (1) being located on or buried in the seabed with a suitable tool at a location where a geographical point requires to be retrieved. Radio markers may be deployed, for example, by means of a subsea vehicle (2). The subsea vehicle (2) is equipped with a positioning system and gyro (6) when the radio markers (1) are deployed, thereby enabling the approximate position of each individual radio marker (1) to be recorded with global map position. A subsea vehicle equipped with a radio antenna detects radio markers after returning to the approximate position by means of the coordinates.

5 Claims, 2 Drawing Sheets

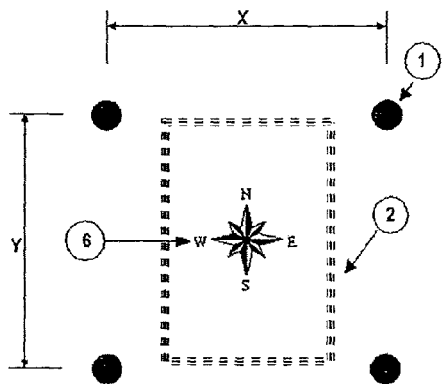
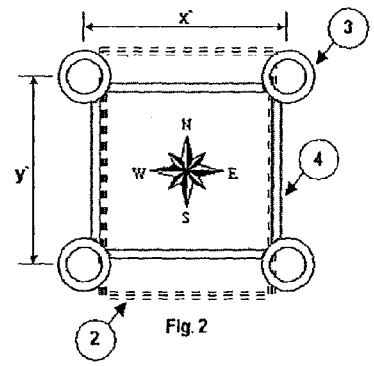
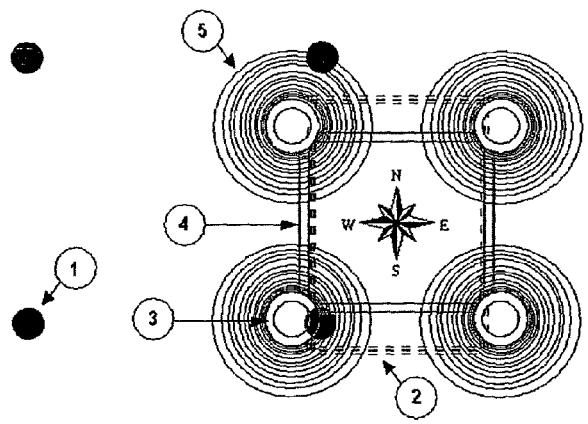
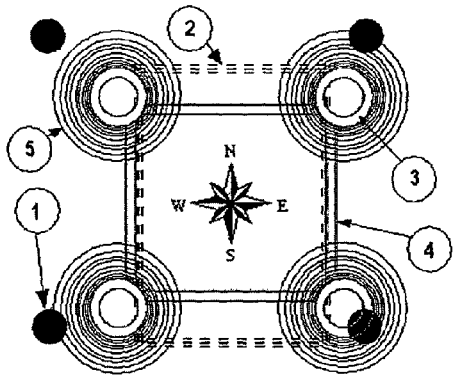
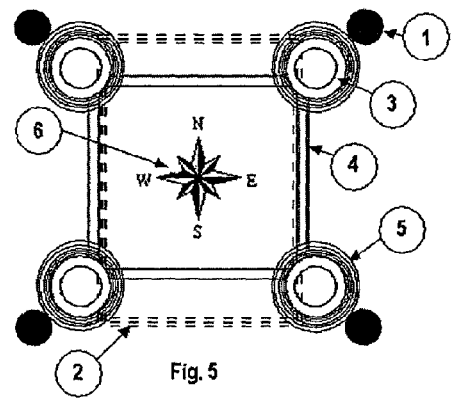

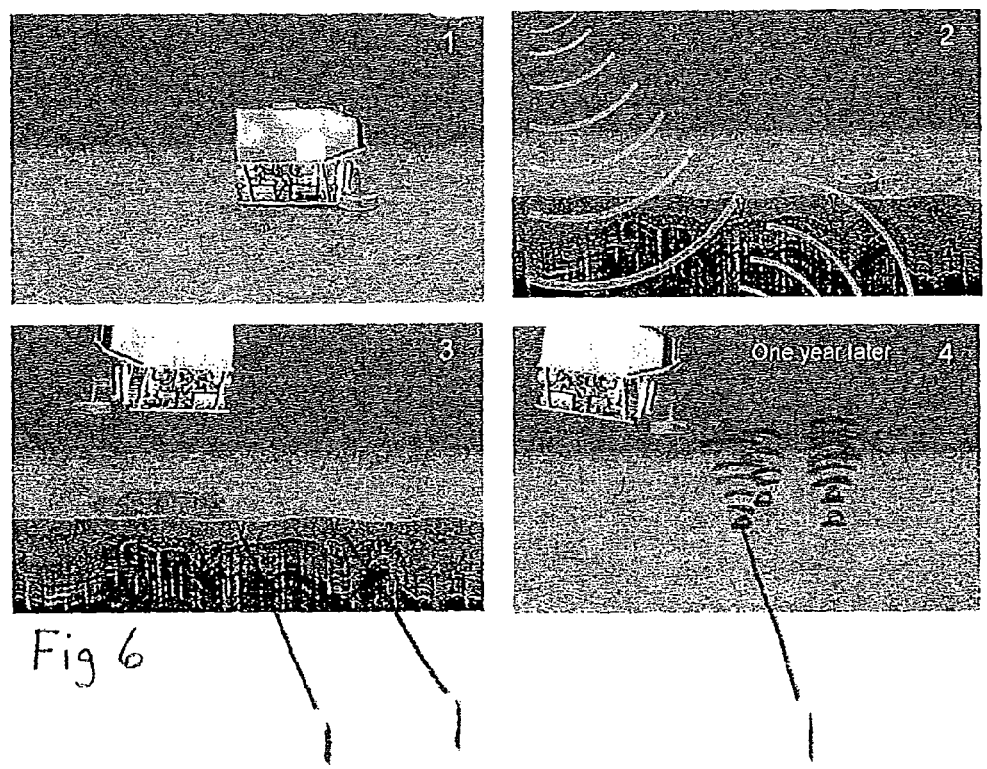

METHOD FOR RETRIEVING A GEOGRAPHICAL POINT ON THE SEABED

TECHNICAL FIELD

This invention relates to a method for relocating a geographical point on the seabed.

The method is comprised of one or more radio markers which are located on or buried in the seabed, a tool suitable for locating radio markers together with an arrangement of one or more radio antennas for detection of radio markers. Detectability range between radio markers and the radio antennas can be adjusted by supplying more or less power to the radio antennas.

Furthermore, the invention consists of a control and database program to control and record an RFID signal from the radio antennas.

BACKGROUND

RFID, Radio Frequency Identification, employs a small radio marker (RFID chip) which includes an electronic circuit/processor with integrated antenna. The radio marker has a unique identification number. When the radio marker is subjected to a radio signal with a specific frequency, it sends back an echo. A radio antenna intercepts this signal if the radio marker is within range. Further information on location can either be stored in the radio marker or in an external database.

A typical area of application for such a device may be in deployment of seismic nodes on the seabed where nodes require to be located, picked up and then replaced in the same location at a later time with as little deviation as possible.

The prior art comprises solutions such as acoustic position transmitters (transponders) which are deployed on the seabed and where cross bearing is employed to obtain a sufficiently accurate indication of position within the range of the transponders.

From US patent no. US 2006/256652 a device is known for locating seismic nodes by means of acoustic locators.

The most important innovative elements in relation to existing technology are:
- Each individual radio marker is programmed and transmits its unique signal
- Passive radio markers without batteries are virtually everlasting
- It is simple and time-saving to deploy radio markers compared to acoustic transponders
- Radio markers can be permanently installed down in the seabed without the risk of being damaged by fishing tackle such as trawls and trawl doors
- If offers the possibility of integration with sensors

BRIEF DESCRIPTION OF THE DRAWINGS

FIG. 1 illustrates a subsea vehicle 2 on the location and in the process of deploying radio markers 1 with a suitable tool (not shown in the drawing).

FIG. 2 illustrates a subsea vehicle 2 on which is mounted a frame 4 with radio antennas 3.

FIG. 3 illustrates a subsea vehicle 2 with radio antennas 3 which are searching for a location and have made contact with two of the radio markers 1 located on or buried in the seabed.

FIG. 4 illustrates a subsea vehicle 2 with radio antennas 3 which have made contact with three radio markers 1 with reduced power on the radio antennas 3 and are therefore approaching the centre of the location.

FIG. 5 illustrates a subsea vehicle 2 with the radio antennas 3 which have made contact with four radio markers 1 with a minimum of power on the radio antennas 3 and therefore located in the centre of the location. The same position as when the radio markers 1 were originally deployed.

FIG. 6 (1-4) is a perspective view of the implementation of the method as illustrated in FIGS. 1-5.

DETAILED DESCRIPTION OF THE INVENTION

The invention involves locating one or more radio markers 1 on or buried in the seabed with a suitable tool at a location where an accurate positioning is required. The radio markers may be deployed, for example, by means of a subsea vehicle 2. The subsea vehicle 2 is equipped with a positioning system and gyro 6 when deploying radio markers 1, thereby enabling the coordinates of each individual radio marker 1 to be recorded with global map position. A subsea vehicle equipped with radio antennas detects the radio markers after returning to the approximate position by means of the coordinates.

According to one aspect of the invention, in order to facilitate finding the location in the future, several radio markers 1 are deployed in a local grid where the position of each individual radio marker is known. According to a second aspect of the invention several radio antennas 3 are employed when the radio markers 1 have to be detected in order to achieve a faster and more accurate positioning.

The detectability range between the radio markers 1 and the radio antennas 3 can be adjusted by supplying more or less power to the radio antenna 3. This is to enable accurate positioning to be performed between the deployed radio markers 1.

In order to find the deployed radio markers 1, which have a relatively short range, an eternal positioning system is first employed with sufficient accuracy to enable it to find the general area where the radio markers are deployed. Acoustic systems are most commonly used between a remotely controlled subsea vessel 2 and a ship where the accuracy of the positioning between the ship and the seabed is generally within ±1% of the water depth. Global coordinates (map references) for the location of the radio markers 1 can be obtained from the positioning systems of the ship and the remotely controlled subsea vessel 2.

After the general area has been found, a subsea vehicle equipped with radio antennas is employed to locate the radio markers. According to one aspect of the invention the markers are deployed in a grid where the distance between the chips is known. The point of interest is located in the centre of the grid. As shown in the figures, an example of such a grid may include 4 radio markers forming a square, with the point of interest located in the centre of the square.

According to an aspect of the invention the subsea vehicle's antennas are mounted on a frame corresponding to the radio marker grid. The position of the frame relative to the centre of the grid is confirmed by the signal strength from the outer radio markers being equalized.

The invention claimed is:

1. A method for locating a point of interest on the seabed, comprising:
   a. deploying one or more radio markers on or buried in the seabed in a pattern, so that a point of interest is located in the center of the pattern,
   b. recording the approximate coordinates of the radio markers, including the relative positions and distances between the radio markers, for later use, c. on return, employing the coordinates to relocate the approximate position of the radio markers,
d. using a subsea vehicle equipped with one or more radio antennas to detect the radio markers, wherein the subsea vehicle is manoeuvred until the signal strengths from the radio markers forming the pattern are equalized.

2. A method according to claim 1, wherein each radio marker has a unique code.

3. A method according to claim 1, wherein the radio markers are passive, and obtain the energy necessary for transmitting their signals from a radio signal transmitted from the subsea vehicle.

4. A method according to claim 1, wherein the radio markers are equipped with batteries.

5. A method according to one of the preceding claims, wherein four radio markers are deployed in a square, and that four radio antennas are mounted in a square on a frame on the subsea vehicle.

* * * * *